United States Patent

[11] 3,617,386

| [72] | Inventors | Robert J. Bosben<br>Madison;<br>Ralph H. Feldhake, Verona; Patrick J.<br>Spellman, Middleton, all of Wis. |
|---|---|---|
| [21] | Appl. No. | 33,306 |
| [22] | Filed | Apr. 30, 1970 |
| [45] | Patented | Nov. 2, 1971 |
| [73] | Assignee | ESB Incorporated |

[54] SEALED CELL CONSTRUCTION
5 Claims, 2 Drawing Figs.

[52] U.S. Cl. ................................................. 136/107,
136/177, 136/178, 136/181
[51] Int. Cl. ................................................. H01m 1/06
[50] Field of Search ................................. 136/177,
178, 179, 181, 182, 107

[56] References Cited
UNITED STATES PATENTS

| 2,269,040 | 1/1942 | Rublee ......................... | 136/179 |
| 3,081,366 | 3/1963 | Belove ......................... | 136/181 |
| 3,218,197 | 11/1965 | Carmichael et al. ........ | 136/177 |
| 3,373,057 | 3/1968 | Jost et al. .................... | 136/179 |

*Primary Examiner*—Donald L. Walton
*Attorneys*—Alfred J. Snyder, Jr., Robert H. Robinson, Raymond L. Balfour and Anthony J. Rossi

ABSTRACT: A sealed electric battery cell having a single plastic member which seals the cell, insulates the cell terminal, provides a hydrogen gas permeable diaphragm, a circuit opening actuator and a pressure frangible safety device.

PATENTED NOV 2 1971　　　　3,617,386

INVENTORS.
ROBERT J. BOSBEN
RALPH H. FELDHAKE
PATRICK J. SPELLMAN

SEALED CELL CONSTRUCTION

BACKGROUND OF THE INVENTION

1. Field of the Invention

This invention relates to an improved electrochemical cell construction applicable to both primary and secondary sealed cells.

2. Description of the Prior Art

There are numerous forms of dry and sealed cells in common use by the general public. Some of these are sold as rechargeable devices and some are not. Because of similarities in size, appearance and use, it is likely that on occasion the user will mistake one type of cell for another. Unfortunately, the inadvertent confusion of cell types can lead to considerable hazard.

The danger from sealed cells of any kind stems from the uncontrolled formation of gasses within the cell structure. Gasses may be formed within the cell from overcharge, from overdischarge or from overheating. The quantity of gas evolved can be sufficient to burst the cell container at pressures up to several hundred pounds per square inch with accompanying damage. Additional damage can occur if the gasses, often a mixture of oxygen and hydrogen should ignite.

The possibilities for overcharge or overdischarge are many. For instance, the user of an appliance requiring several cells may put one cell in backwards. Use of the device in this condition will cause this cell to be over charged. Again, a user of an appliance may mix an old cell with new cells. Use of the device then may cause the old cell to be overdischarged.

A user may attempt to recharge a spent primary cell either from confusing it with a secondary or rechargeable type or because of direct inadvertence.

Spent cells can find their way into stoves, incinerators and open fires, with the result that they may be heated to the danger point.

A cell type known as the alkaline manganese cell is particularly prone to develop internal gas on abuse because it is necessary for electrochemical reasons to maintain an extremely tight cell seal. This cell, in common with many other cell types, evolves hydrogen at a low but continuing rate during storage and use and the need for a tight seal poses considerable problems to the battery producer. Although hydrogen gas is undesirable in sealed cells, it is necessary to retain all possible water or water vapor as water is a necessary ingredient in this as well as most all other cell systems.

It can readily be seen that some form of protective device which will prevent the development of undue pressures in small consumer-used sealed cells is highly desirable. Such a device should be operable both for rapid gas evolution from electrochemical abuse and for slow evolution of gasses throughout the life of the cell.

A number of devices have been proposed, some especially for sealed secondary type cells and others for the more common primary cells.

In one design, a seal diaphragm is built into the cell so as to be against a knife point. If internal cell pressure becomes too great, the diaphragm is forced against the point until it is cut and the pressure is relieved. Of course, this destroys the cell for further use and also allows the cell electrolyte to escape and possibly cause chemical damage.

In the usual LeClanche dry cell, a sealing gasket of pasteboard or similar porous material is used. These cells are erratic in their gas and water leakage behavior, due to the difficulties in controlling the pore size of the pasteboard.

Gas consuming electrodes have been described. These suffer in the main from unreliability.

Secondary (or rechargeable) cells have been described having a pressure activated switch which will open when the internal cell pressure builds up to a certain level. This stops the flow of current and further formation of gas from electrochemical action. It does not help with the slow accumulation of gas from purely chemical reactions. Also, the pressure switch devices which have been disclosed have been in general complicated, costly and in several cases required space outside of the cell.

Another means of controlling excessive internal pressure has been to provide an empty reservoir in which excessive gas can be stored without undue pressure rise. Any such construction as this will necessarily reduce the room available for active cell ingredients and thus the cell will be limited in its electrical performance.

Cells, both primary and secondary, have been described containing solid diaphragms which are permeable to hydrogen but far less permeable to water vapors. Nylon, polyethylene and polyvinylchloride members as well as cellulosic films and butyrate films have this capability, unfortunately, these materials pass hydrogen at rather low rates. A typical value is: $1.2 \times 10^{1a89}$ ccs./cm. thickness/second/cm.$^2$ area/cm. Hg pressure. Thus, these devices can only protect against slow gas evolution and are not suitable for protection against the rapid gas evolution such as from reversal or overcharge.

SUMMARY OF THE INVENTION

In accordance with the invention, a cylindrical cell assembled in a metal case has a metallic terminal and cover piece insulated from the metal case. A flexible, nonconductive diaphragm member is located beneath the cover piece and its lip forms the insulating means between the metal case and the cover piece. A metallic contact member is mounted upon and traverses the diaphragm and provides an electrical path between one of the cell electrodes and a flexible metallic member located between the diaphragm and the cover piece. The flexible metallic member provides an electrical path between the contact member and the metallic terminal and cover piece. The shapes of the flexible member and of the flexible diaphragm are such that when the diaphragm is pressed outward by internal gas pressure, the contact between the flexible metallic member and the metallic contact member mounted on the flexible diaphragm is broken. The flexible diaphragm is chosen from a class of materials that are readily permeable to hydrogen but not readily permeable to water vapor. The diaphragm is provided with a weakened section so that it will rupture at a pressure safely below the rupture strength of the metal battery case. By these means, a sealed battery design is provided that nondestructively protects the user against rupture caused by the slow evolution of hydrogen gas, and the rapid evolution of gas from electrochemical action. If, for other reasons, dangerous gas pressure should build up in the cell, the user is protected against violent cell rupture by the fracture of the weak portions of the diaphragm. These features are provided by a simple but reliable construction not requiring additional space in normal cell designs.

These and other features and advantages of the invention will become apparent from the following description:

DESCRIPTION OF THE PREFERRED EMBODIMENT

Figure 1:
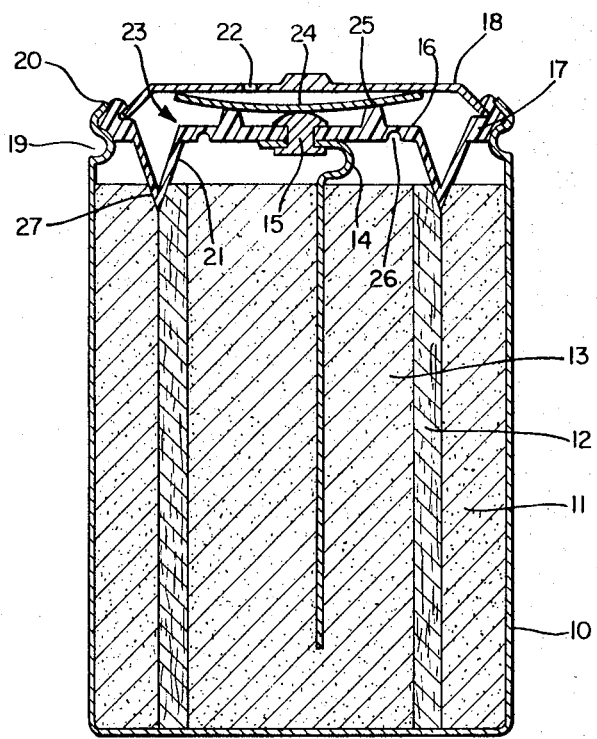
FIG. 1 is a vertical cross section of a cylindrical sealed alkaline manganese cell embodying the invention.

On the drawings, 10 represents a metal container in which the cell parts are located. A tight fitting tube of positive depolarizer mix 11 is forced into container 10, makes electrical contact with it and forms the positive electrode. The depolarizer mix is comprised of compacted manganese dioxide and graphite powder as well known to the battery art. A separator tube 12 made of a porous material such as propylene felt wet with electrolyte is located within the bore of the positive mix. The space within the separator tube is filled with a suspension 13 of amalgamated zinc powder, alkaline electrolyte and a jelling agent such as carboxymethyl cellulose to form the negative electrode. A metallic current collector 14 is embedded in the jelled zinc. It leads from the zinc component 13 to a first contact means 15, in this case a rivet passing through a flexible diaphragm 16, and sealing the opening therethrough. The current collector 14 is flexible and has one or more bends in it so that it does not hinder the motion of flexible diaphragm 16. The flexible diaphragm 16 has a reinforced lip 17 which encloses the circumference of cell terminal and cover 18. Lip 17 is compressed between a bead 19 and a flange 20 sealing the cell cavity and electrically insulating cover 18 from can 10. The flexible diaphragm 16 is made of a material readily permeable to hydrogen but not readily permeable to water vapor, in this case nylon is used. A V-shaped circular convolution 21 is formed on diaphragm 16 to increase its area and flexibility. The convolution 21 penetrates into the end of separator 12 as is shown at 27 and serves to prevent zinc from bridging from negative to positive electrodes over the edge of separator 12.

The cell terminal and cover piece 18 has one or more holes 22 so that the entire space 23 between diaphragm 16 and piece 18 is kept at atmospheric pressure.

A resilient metallic second contact means 24 normally touching near its center the first contact means 15 and at its extremities the cell terminal and cover piece 18 electrically bridges and completes the internal electrical circuit of the cell from first contact means 15 to cell terminal and cover piece 18.

The second contact means 24 may be a single strip of spring material or it may take the form of a star having three or more arms. Preferred materials for this part are copper spring alloy or spring steel.

The resilient second contact means 24 bears upon an annular projection 25 formed upon the surface of flexible diaphragm 16. The bearing point of projection 25 on the resilient second contact means 24 is located between the points where resilient second contact means 24 touches the cell terminal and cover piece 22 and the first contact means 15 fastened to the diaphragm 16. The resilient second contact means therefore forms a lever of the third class. By this mechanism, the motion of the center portion of the second contact means in the vicinity of first contact means 15 will be greater than the motion of projection 15 on diaphragm 16. This insures that when diaphragm 16 moves upward from internal gas pressure a given distance, the resilient second contact means 24 will move a greater distance and separate from first contact means 15 thereby breaking the electrical circuit within the cell.

Protruberances (not shown) on cell terminal and cover piece 18 and on annular projection 25 serve to position the resilient second contact piece 24 and prevent it from slipping out of its proper location. Groove 26 formed in diaphragm 16 provides a calculated weak point in the diaphragm. By making the groove concentric with the center of the diaphragm, a desirable degree of flexibility can be given to the diaphragm.

Under normal conditions, the small amount of hydrogen evolved by the zinc electrode 13 will diffuse through diaphragm 16. If through mischance the cell should be electrically connected so as to produce large amounts of gas by electrolysis, diaphragm 16 will flex upward forcing flexible second contact means 24 out of contact with first contact means 15 breaking the electrical circuit within the cell and preventing further formation of gas by electrical means. After pressure has been relieved by diffusion through diaphragm, the cell will again be useable. If, however, the cell should evolve gas in large quantity from a nonelectrical cause—such as being overheated—diaphragm 16 will rupture at weak area 26 before external damage can be done.

Figure 2:
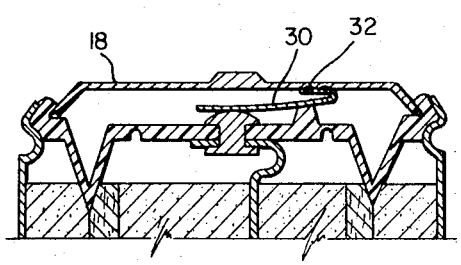
FIG. 2 is a partial cross section of a similar cell embodying a modification of the invention.

A modification of this invention is shown in FIG. 2. In this instance, the second contact piece 30 is shown with one end welded at 32 to the cell terminal and cover piece 18. Other parts are the same as shown in FIG. 1.

Thus, a novel safety feature for use on many forms of sealed cell has been described. It protects the cell against a slow pressure buildup from normal chemical action as well as rapid pressure buildup from electrical abuse without harm to the cell. It also protects the user from the dangers of cell pressure buildup from any other reason.

From the foregoing, it will be understood we have provided a cell construction wherein a single member, namely diaphragm 16, serves as a gas diffusion membrane, a cell sealing member, a cell terminal insulator, a switch operating diaphragm, and a frangible safety diaphragm.

Having fully described this invention, we claim:

1. In a sealed electric battery cell having a positive electrode, a negative electrode, a separator between said electrodes, an electrolyte, a metallic container, and a cell terminal and cover piece insulated from the container, the improvement comprising:
    a. a flexible nonmetallic diaphragm and container closure means interposed between the cell terminal and cover piece and the metallic container;
    b. a first contact means mounted on the diaphragm and extending therethrough, the first contact means being electrically connected to one of said battery electrodes;
    c. a resilient second contact means electrically bridging the cell terminal and cover piece and the first contact means; and
    d. an engagement area on the flexible diaphragm at most slightly engaging the resilient second contact means under normal conditions of cell internal pressure and under conditions of high internal cell pressure engaging the second contact means beyond the point of debridging the second contact means from the first contact means.

2. A sealed electric battery cell as described in claim 1 in which the resilient diaphragm is relatively permeable to hydrogen and relatively impermeable to water vapor.

3. In a sealed primary electric cell having a cell element including a positive depolarizer mix, a negative electrode, a separator between the negative electrode and the depolarizer mix; an electrolyte and a metallic container, the improvement comprising:
    a. a resilient nonmetallic cell closure diaphragm having a circumferential lip, the diaphragm being relatively permeable to hydrogen gas and relatively impermeable to water vapor;
    b. a cell terminal and cover piece external to the diaphragm and having at least one hole therethrough, the cell terminal and cover piece secured to the metallic container by a bead and a flange and insulated therefrom by the circumferential lip of the diaphragm;
    c. an internal intermediate electrical contact piece mounted on and extending through the diaphragm and electrically connected to one of the electrodes;
    d. a resilient electrically conductive member, having a central portion normally in electrical bridging contact with the internal intermediate contact piece and an outer portion in electrical contact with the underside of the terminal and cover piece; and
    e. a projection located on the diaphragm facing the resilient electrically conductive member intermediate between the portion of said member making electrical contact with the internal intermediate contact piece and the portion making electrical contact with the cell terminal and cover piece and a height sufficient to approach the flexible conductive member when the cell is in a normal condition of internal pressure and engage and debridge said resilient conductive member from the internal intermediate electrical contact piece when the cell contains an excessive internal pressure.

4. A cell as described in claim 3 in which a portion of the flexible diaphragm is thinner than the remainder of the diaphragm.

5. A cell as described in claim 3 in which the depolarizer is manganese dioxide, the negative electrode, zinc and the electrolyte, alkaline solution.

* * * * *